US 6,536,798 B1

(12) United States Patent
Hamilton

(10) Patent No.: US 6,536,798 B1
(45) Date of Patent: Mar. 25, 2003

(54) CONTROLLING ACTIVATION OF RESTRAINT DEVICES IN A VEHICLE

(75) Inventor: Brian K. Hamilton, Littleton, CO (US)

(73) Assignee: Aùtoliv ASP, Inc.

( * ) Notice: Subject to any disclaimer, the term of this patent is extended or adjusted under 35 U.S.C. 154(b) by 0 days.

(21) Appl. No.: 09/675,553

(22) Filed: Sep. 27, 2000

(51) Int. Cl.$^7$ ............................................... B60R 21/32
(52) U.S. Cl. .................. 280/735; 102/275.1; 102/275.6
(58) Field of Search .......................... 102/202.5, 275.1; 361/248, 249; 307/10.1; 280/728.1, 731, 732, 733, 734, 735

(56) References Cited

U.S. PATENT DOCUMENTS

| | | | |
|---|---|---|---|
| 4,220,087 A | | 9/1980 | Posson ...................... 102/27 R |
| 4,381,829 A | * | 5/1983 | Montaron .................... 180/274 |
| 4,455,941 A | * | 6/1984 | Walker et al. ............ 102/275.8 |
| 4,699,400 A | | 10/1987 | Adams et al. ............... 280/731 |
| 4,924,774 A | | 5/1990 | Lenzen ...................... 102/202.7 |
| 5,007,661 A | * | 4/1991 | Lenzen ........................ 280/735 |
| 5,138,946 A | | 8/1992 | Soltz et al. .................. 102/201 |
| 5,181,737 A | * | 1/1993 | Lenzen et al. ............... 280/732 |
| 5,191,167 A | | 3/1993 | Beyer .......................... 102/201 |
| 5,437,229 A | | 8/1995 | Taylor et al. ................ 102/288 |
| 5,460,407 A | | 10/1995 | Stuckle ........................ 280/741 |
| 5,520,114 A | * | 5/1996 | Guimard et al. |
| 5,540,154 A | * | 7/1996 | Wilcox et al. |
| 5,597,973 A | * | 1/1997 | Gladden et al. |
| 5,660,413 A | | 8/1997 | Bergerson et al. .......... 280/741 |
| 5,713,595 A | | 2/1998 | Mooney et al. ............. 280/736 |
| 5,825,098 A | * | 10/1998 | Darby et al. |
| 5,826,903 A | | 10/1998 | Schiller et al. ............. 280/735 |
| 5,894,103 A | * | 4/1999 | Shann ........................ 102/215 |
| 5,939,661 A | * | 8/1999 | Bayliss |
| 6,006,671 A | * | 12/1999 | Yunan |
| 6,166,452 A | * | 12/2000 | Adams et al. |
| 6,170,867 B1 | * | 1/2001 | Rink et al. ................... 280/736 |
| 6,218,740 B1 | * | 4/2001 | Mildice |
| 6,247,410 B1 | * | 6/2001 | Garcia |
| 6,272,992 B1 | * | 8/2001 | Chatley, Jr. |
| RE37,843 E | * | 9/2002 | Blumenthal et al. ........ 280/737 |

OTHER PUBLICATIONS

Reiner Lenzen, Air Bag and Seat Belt Pretensioner Ignition Studies using NONEL and ITLX at the Proceedings of the Fourteenth Symposium on Explosives and Pyrotechnics, Feb. 13–15, 1990.

* cited by examiner

Primary Examiner—Michael J. Carone
Assistant Examiner—Troy Chambers
(74) Attorney, Agent, or Firm—Sheridan Ross P.C.

(57) ABSTRACT

An apparatus for activating a selected one or more restraint devices located in a vehicle is provided. The apparatus reliably and inexpensively activates restraint devices upon the receipt of one or more appropriate signals. The apparatus includes a control unit having a housing enclosing a processor, a circuit board, and a plurality of initiator assemblies. Explosive transfer lines are inter-connected to the initiator assemblies at a first end, and to the restraint devices at a second end. Upon the receipt of an appropriate signal from one or more sensors located in the vehicle, the processor activates at least one of the initiator assemblies, which in turn ignites at least one of the explosive transfer lines. The explosion propagates along the explosive transfer line to its corresponding restraint device or devices to activate one or more of them. Additionally, the explosive transfer lines feature a metalized layer that provides moisture resistance, and a way for verifying the continuity of the explosive transfer line.

15 Claims, 9 Drawing Sheets

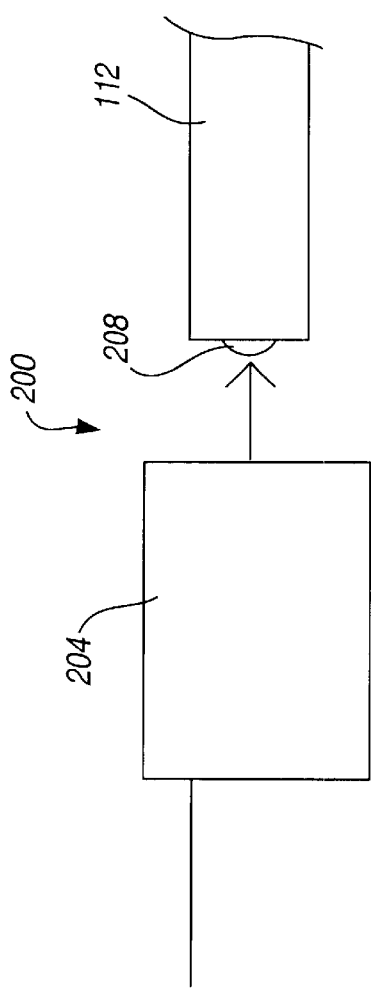

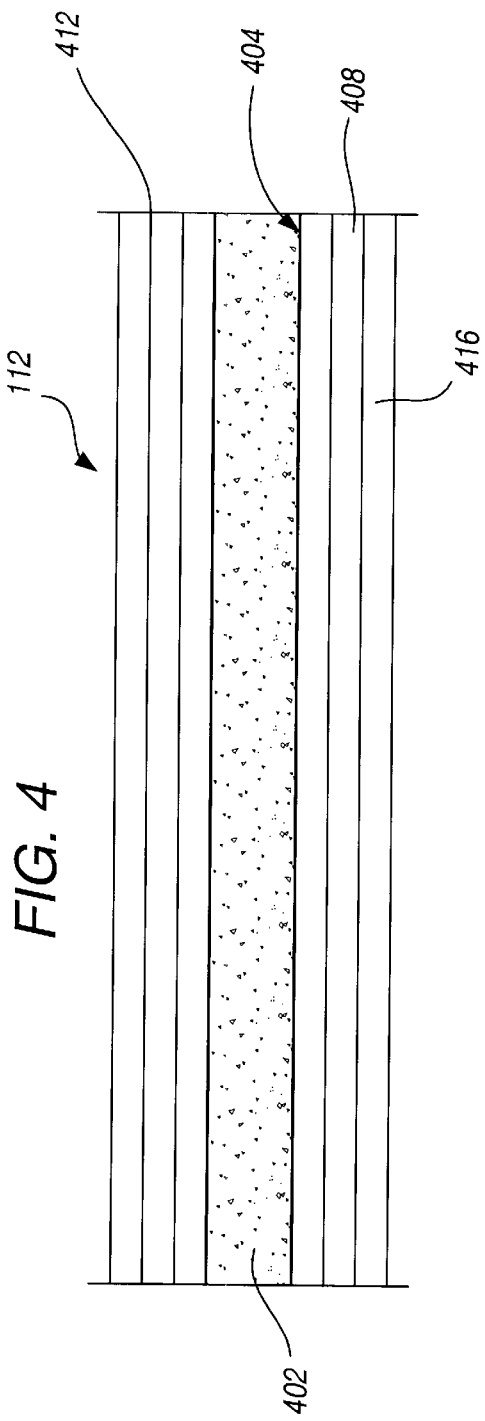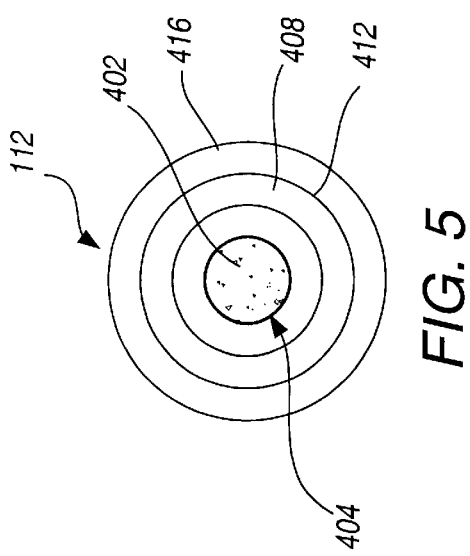

SERVICEABLE

NON-SERVICEABLE

CONTROLLING ACTIVATION OF RESTRAINT DEVICES IN A VEHICLE

FIELD OF THE INVENTION

The present invention relates to the activation of restraint devices in a vehicle. In particular, the present invention relates to the activation of restraint devices in a vehicle using explosive transfer lines, triggered from a central control unit.

BACKGROUND OF THE INVENTION

There are various methods for restraining the occupants of a vehicle in the event of an accident. Many recent devices require the activation of a gas generating substance or material to inflate air bags or pretension seat belts. The initiation of the substances in these restraint devices typically requires the firing of a squib or initiator. In operation, one or more squibs can be activated using signals from sensors, which monitor such parameters as the rate of deceleration of the vehicle. When a predetermined rate of deceleration has been achieved, such a signal will ignite the squib by sending an electric current through it, thereby triggering the restraint device.

The squib is a relatively expensive component, and therefore an important factor in the cost of restraint systems. Additionally, systems using squibs require an electrical lead that carries the ignition signal(s) to each squib. In such an arrangement, monitoring the integrity of the connection to each individual squib requires that a low-level current be periodically provided through the electrical leads and the bridge wire of the squib. Because of the high cost of squibs, and the necessary complexity of their firing and monitoring systems, it would be advantageous to provide a vehicle restraint system that could be operated without the use of such devices.

Alternatives to the use of squibs for initiating the deployment of vehicle restraint devices have been proposed. In one such device, a laser diode mounted in the inflator of an air bag is used to ignite pyrotechnic material deposited adjacent to the propellent of the inflator. However, like the conventional system that uses squibs, the integrity of such a system is difficult to monitor.

Other proposed systems use a centrally located laser device, whose output is directed to a fiber optic cable. The fiber optic cable is then used to transmit the radiation from the laser to a charge located at the inflator. However, such systems are disadvantageous in that fiber optic cables are expensive, "very lossy" (increases laser power requirement) and it is difficult to monitor their integrity.

Yet another method that has been proposed for initiating restraint devices in a vehicle relies on the use of explosive transfer lines. In such systems, a centrally located squib is used to initiate an explosive reaction in an explosive transfer line. After having been initiated, the explosive transfer line propagates the explosion started by the squib and carries it to the propellant of the inflator. Upon reaching the inflator, the explosion carried by the explosive transfer line initiates the inflator propellant, activating the restraint device. However, such systems have suffered from a number of disadvantages. For instance, such a system continues to depend on the use of squibs. As previously noted, squibs are expensive, thereby raising the cost of the restraint system, and in turn the cost of the vehicle itself. Also, explosive transfer lines have been expensive to produce, and have lacked a reliable method for verifying their integrity. Of course, in a safety system such as a vehicle restraint system, reliable operation is of primary importance.

Although the prior art describes systems and designs for triggering the operation of vehicle restraint systems, such as air bags and seat belt pretensioners, it would be advantageous to provide a system that did so at a lower cost. Concomitantly, such a system must be reliable and its integrity must be easily confirmed.

SUMMARY OF THE INVENTION

In accordance with the present invention, an apparatus for activating a selected one or more restraint devices located in a vehicle is disclosed. The apparatus includes a plurality of restraint devices, with a plurality of explosive transfer lines connected to the restraint devices. In one embodiment, the apparatus further includes a control unit, such as a central control unit, for use in activating each of the restraint devices. The central control unit has a housing, and includes a processor connected to a circuit board. Mounted to the circuit board are a plurality of initiator assemblies, each of which includes a circuit element. A first circuit element is operatively connected to the first explosive transfer line and the processor is used to control activation of the first circuit element, thereby igniting the first explosive transfer line.

The explosive transfer line can be formed from a first material that has unacceptable moisture resistance, and a second material that provides acceptable moisture resistance. The explosive transfer line may include a metalized layer for providing an electrical path for diagnosing the electrical continuity of the explosive transfer line. In one embodiment, the metalized layer has the property of providing acceptable moisture resistance for the explosive transfer line. The explosive transfer line can be further provided with an outer layer for providing abrasion protection. This outer layer is disposed outwardly of the metalized layer.

The circuit element of the present invention may include a laser diode, a bridge wire, a printed bridge, a semiconductor bridge device, a vapor deposited bridge or any other device for inducing pyrotechnic activation using an electrical signal. The initiator assemblies may include pyrotechnic material. In one embodiment, the explosive transfer line has pyrotechnic material deposited thereon in liquid slurry form. In a further embodiment, the circuit board is contained in the housing, and portions of at least the first explosive transfer line extend into the housing, while remaining portions of the first explosive transfer line extend away from the housing and toward a first restraint device.

Additional features involving use of explosive transfer lines in a vehicle for inflating an inflatable have been devised. Monitoring circuitry can be included for checking the continuity of each explosive transfer line. A hermetic seal can be provided with the control unit, instead of being associated with a squib located at the inflatable. A number of connectors can be utilized having different designs and desired functions. An end connector can be included adjacent to the restraint device for connecting the explosive transfer line thereto. Such an end connector can be serviceable or non-serviceable. When employed with a serviceable end connector, service personnel can readily disconnect the end connector and the explosive transfer line connected thereto from the restraint device. A transfer joint, such as a T-connector, can also be utilized when implementing a vehicle inflation system having a number of explosive transfer lines. The T-connector has three legs or members. In one embodiment, an explosive transfer line from the central control unit is held in one of the three legs, while two additional explosive transfer lines are held in the other two legs. The explosive transfer line from the central control unit activates the other two explosive transfer lines that are in operative communication with two restraint devices. A bridge connector interconnects or bridges two explosive transfer line portions and can be useful in extending the length that an explosive transfer line must have in order to be connected to a particular restraint device. With regard to installation of explosive transfer lines, elongated hollow members or tubes may be laid out in the vehicle along paths that are to be occupied by explosive transfer lines. The explosive transfer lines can be inserted or pushed through such hollow members easily and at convenient times. After insertion through a particular tube, the explosive transfer line can be properly held in place adjacent to the restraint device.

Based on the foregoing summary, a number of salient features of the present invention are readily discerned. A vehicle inflation system can be provided having centralized control over a number of restraint devices in a vehicle. The centralized control utilizes explosive transfer lines, rather than more expensive squibs that are conventional components of an inflator used to fill an air bag with gases. In one embodiment, the explosive transfer line has two materials, with one of the materials having unacceptable moisture resistance and the other material providing acceptable moisture resistance. Such a two layer design reduces costs over commonly used components. In another embodiment, the explosive transfer line has a metalized layer that may offer an electrical path for diagnosing electrical continuity in the explosive transfer line. Preferably, the explosive transfer line has an outer layer that protects the transfer line against abrasion. The system of the present invention is impervious to static electricity and RF energy initiations.

Additional advantages of the present invention will become readily apparent from the following discussion, particularly when taken together with the accompanying drawings.

BRIEF DESCRIPTION OF THE DRAWINGS

FIG. 2 illustrates further details of an initiator assembly having as a circuit element a laser diode operatively connected to an explosive transfer line, with the pyrotechnic material deposited on an end of the explosive transfer line;

FIG. 3 illustrates further details of an initiator assembly having as a circuit element a laser diode operatively connected to an explosive transfer line in an alternative embodiment, with the pyrotechnic material deposited directly on the laser diode;

FIG. 4 is a side cross-sectional view of an explosive transfer line according to one embodiment of the present invention;

FIG. 5 is an end-on cross-sectional view of an explosive transfer line according to one embodiment of the present invention;

DETAILED DESCRIPTION

In accordance with the present invention, an apparatus is provided for controlling the activation of restraint devices in a vehicle.

Figure 1:
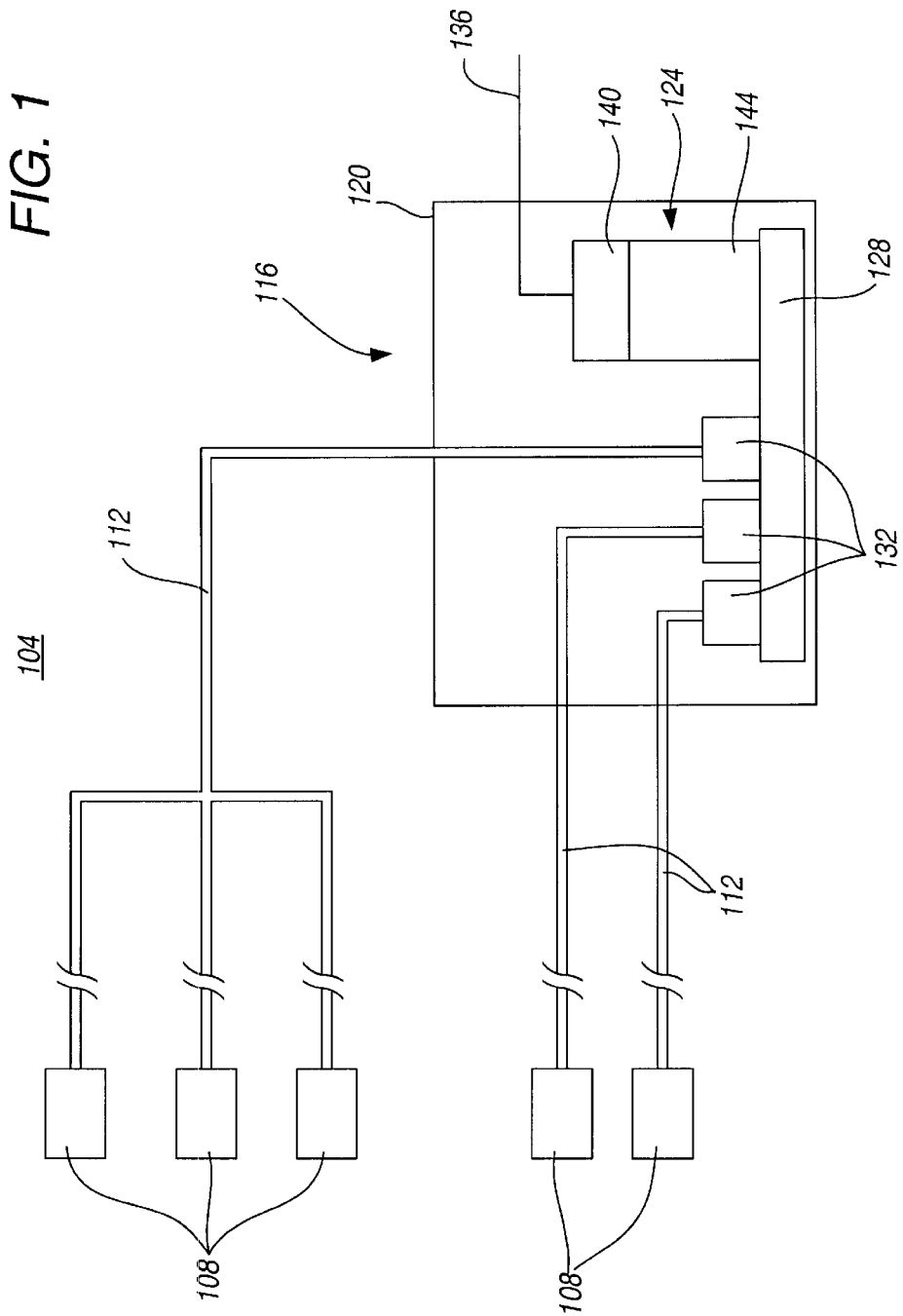
FIG. 1 is a diagrammatic illustration of the apparatus for controlling the activation of restraint devices in a vehicle of the present invention.

With reference to FIG. 1, the control apparatus 104 of the present invention is shown diagrammatically. In general, the control apparatus 104 is comprised of a plurality of restraint devices 108 located within a vehicle. The apparatus further includes a plurality of explosive transfer lines 112, which are interconnected to the restraint devices 108 at a first end and to the central control unit 116 at a second end. The central control unit 116 generally includes an environmentally sealed housing 120, enclosing a control or sensing/diagnostic module 124, a circuit board 128 and a plurality of initiator assemblies 132. Passing through the housing 120 to interconnect with the initiator assemblies 132 are the explosive transfer lines 112. Also passing through the housing 120 is at least one sensor signal line 136. The sensor signal line 136 interconnects the control module 124 with sensors (not shown). The sensors and uses thereof are well-known to those of ordinary skill in the art. As stated above, the explosive transfer lines 112 interconnect the restraint devices 108 with the initiator assemblies 132.

The control module 124 generally includes a signal interface 140 and a processor 144. The signal interface 140 is connected to the sensor signal line 136. The signal interface 140 is in turn electrically interconnected to the processor 144. The circuit board 128 serves to electrically interconnect the processor 144 with the initiator assemblies 132. The initiator assemblies 132 may include a laser diode, a hot wire, a semiconductor bridge, a vapor deposited bridge or any other device for inducing pyrotechnic activation using an electrical signal. The circuit board 128 may comprise a printed circuit board, as is commonly known in the art. Alternatively, the circuit board 128 may comprise some other form of operative interconnection between the central control unit 124 and the initiator assemblies 132, such as conductive wires, optical fibers or infrared links.

In one embodiment, the initiator assemblies 132 of the present invention include laser diodes. Referring now to FIG. 2, an initiator assembly 132 having a laser diode is generally identified as laser diode initiator assembly 200. The laser diode initiator assembly 200 generally includes a circuit element 204 and pyrotechnic material 208. In the embodiment illustrated in FIG. 2, the pyrotechnic material 208 is deposited on an end of an explosive transfer line 112, and the circuit element 204 is a laser diode. The laser diode 204 and the pyrotechnic material 208 are arranged such that the radiation output from the laser diode 204 will be incident upon the pyrotechnic material 208. The output from the laser diode 204 may be made incident to the pyrotechnic material 208 by locating the laser diode 204 in close proximity to the pyrotechnic material 208, as illustrated in FIG. 2. Alternatively, the output from the laser diode may be directed to the pyrotechnic material 208 using fiber optic material or a lens (not shown). The pyrotechnic material 208 may be deposited on the explosive transfer line 112 in liquid slurry form.

In another embodiment, illustrated in FIG. 3, an initiator assembly having an alternative arrangement of elements is generally identified as laser diode initiator assembly 300. The initiator assembly 300 generally includes a circuit element 304 and pyrotechnic material 308. In the particular embodiment illustrated in FIG. 3, the circuit element 304 is a laser diode. Furthermore, the initiator assembly 300 features pyrotechnic material 308 that has been deposited directly onto the surface of the laser diode 304. In this embodiment, the explosive transfer line 112 is positioned so that its end is proximate to the pyrotechnic material 308. The pyrotechnic material 308 may be deposited on the laser diode 304 in liquid slurry form.

In alternative embodiments, the initiator assemblies 132 of the control apparatus 104 may include circuit elements other than laser diodes. Thus, the circuit element may use hot wire, semiconductor bridge, or other conductor technology that induces pyrotechnic activation by converting electrical energy to heat. Where such circuit elements are used, the pyrotechnic material may be deposited as a slurry directly on the circuit element.

Referring now to FIGS. 4 and 5, cross sections of an explosive transfer line 112 of the present invention is illustrated. The explosive transfer line 112 generally includes a hollow plastic tube having a center longitudinal space 402 containing air and which tube is coated on the inside surface with a thin layer of pyrotechnic mixture 404. Surrounding that core is an inner sheath 408. Surrounding that tube on the outer surface 408 is a metalized layer 412. In one embodiment, the inner sheath 408 is polypropylene. In a further embodiment, the metalized layer 412 is formed by continuous vapor deposition of a metal onto the exterior of the inner sheath 408 just as the inner sheath 408 is extruded. The metalized layer 412 may comprise aluminum, although any material that is electrically conductive, that may be reliably bonded to the inner polypropylene sheath 408, and that is resistant to moisture may be used. Surrounding the metalized layer 412 is an outer layer 416. The purpose of this outer layer 416 is to provide protection for the metalized layer 412 against abrasion. Additionally, the outer layer 416 provides electrical insulation for the metalized layer 412. In one embodiment, the outer layer 416 is polypropylene, polyurethane or any other appropriate plastic. The outer layer could be covered with foamed plastic to improve structure and economy.

In operation, the apparatus for controlling the activation of a restraint devices in a vehicle 104 functions as follows. In the event of a severe deceleration, or other triggering event, a sensor (not shown) sends a signal to the control module 124 via the signal line 136. This signal is received by the control module 124 at the signal interface 140, which is electrically connected to the processor 144. Generally, the signal interface 140 amplifies and conditions the signal received through the signal line 136 so that it is properly recognized by the processor 144. Increasingly, automobile restraint systems rely upon a number of sensors. Accordingly, an automobile restraint system may include sensors monitoring a variety of parameters and having a plurality of sensor signal lines 136. Depending on the particular sensor signal line 136 activated by the sensor, the processor 144 determines whether to deploy the restraint devices 108. In more sophisticated systems, the processor 144 may determine which of the restraint devices 108 to deploy, including the force with which the selected devices 108 are to deploy. This determination thus controls which of the initiator assemblies 132 are energized. The signal to energize the initiator assembly 132 is transmitted from the processor 144 to the initiator assembly 132 through the circuit board 128. Upon being energized, the initiator assembly 132 of the present invention initiates the propagation of an explosion along the particular explosive transfer line or lines 112 associated with the energized initiator assembly 132.

In the embodiment illustrated in FIG. 2, the circuit element 204 of the illustrated initiator assembly 200 is a laser diode. The laser diode 204 is positioned such that the radiation that is output from the laser falls directly upon pyrotechnic material 208. When the radiation reaches the pyrotechnic material 208, the pyrotechnic material ignites, beginning an explosive signal in the explosive transfer line 112. The explosive signal propagates from a first end of the explosive transfer line 112, located at the initiator assembly 200, to a second end of the explosive transfer line 112 located at the restraint device 108, initiating deployment of the restraint device. The initiator assembly 200 illustrated in FIG. 2 may additionally include lenses and/or fiber optic material to direct and focus the radiation from the laser diode 204.

In the embodiment illustrated in FIG. 3, the initiator assembly, here identified as initiator assembly 300, generally includes a laser diode 304 having pyrotechnic material 308 deposited directly thereon. In this embodiment, when a signal is received from the processor 144 through the circuit board 128, the output from the laser diode ignites the pyrotechnic material 308 located at the output of the diode. This ignition of the pyrotechnic material 308 causes an explosive signal to propagate along the explosive transfer line 112 from the first end at the laser diode 304 to the restraint device 108. The arrival of the explosive signal at the restraint device 108 triggers the deployment of the device through a pyrotechnic booster, which can be integral with the explosive transfer line. Deposition of the pyrotechnic material 308 directly on the laser diode 304 removes the need for lenses or fiber optic devices in the initiator assembly 300, reducing the cost of the assembly and improving its reliability. Furthermore, this embodiment reduces the required radiation output level from the laser diode 304, reducing the power requirements of the device.

Referring again to FIG. 4, the propellant 404 of the explosive transfer line 112 is encased in an inner sheath or layer 408. The inner layer 408 provides strength and protection for the propellant 404. The metalized layer 412 surrounding the inner layer 408 is conductive, thereby allowing the integrity of the explosive transfer line 112 to be assessed by sending a small diagnostic electric current through the metalized layer 412 to the inflator ground.

Figure 6:
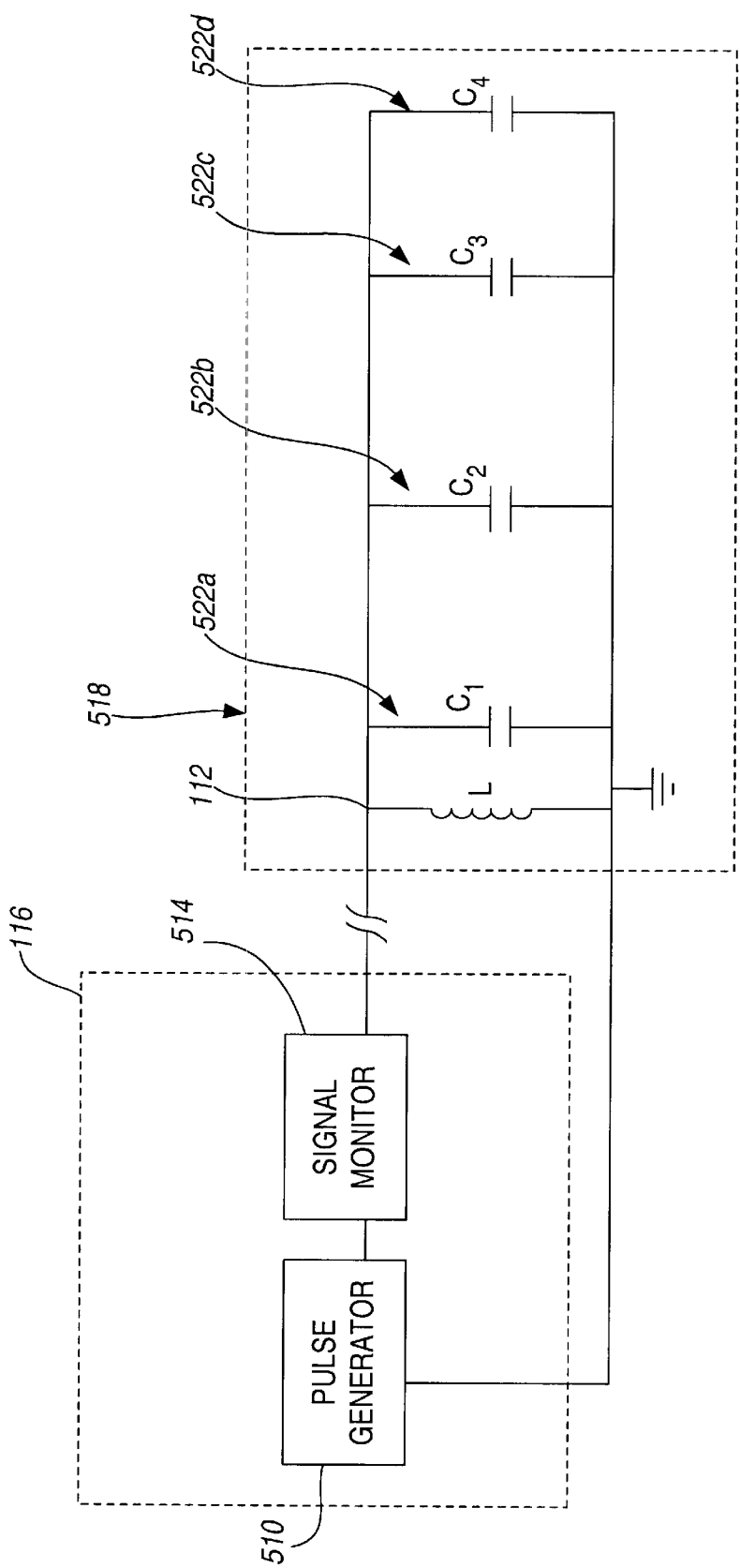
FIG. 6 schematically illustrates one embodiment of circuitry for monitoring continuity of TLX lines associated with restraint devices.

One embodiment for monitoring TLX lines, particularly continuity thereof, is schematically illustrated in FIG. 6. In accordance with this embodiment, the central control unit 116 includes a pulse generator 510 and a signal monitor 514. Each of the pulse generator 510 and the signal monitor 514 are suitably electrically connected to the metalized layer 412 of the explosive transfer line 112. The pulse generator 510 produces pulses that are transmitted along the metalized layer 412 and such pulses are transmitted along all the electrically continuous metalized layer(s) of the explosive transfer line(s). Relatedly, the signal monitor 514 monitors the sent pulses or signals in connection with determining whether or not one or more explosive transfer lines or loops (branches) are electrically continuous or discontinous. With regard to individualizing the determination of electrical continuity for one or more separate loops of TLX lines, a modifying circuit network 518 is electrically connected to the TLX lines. In the illustrated embodiment, this circuit network 518 includes a number of modifying circuits 522a–522d, which number of modifying circuit 522 can be increased depending on the number of TLX branches or loops that might be present. Each modifying circuit 522 is configured to provide a unique return signal that can be interpreted or acts as a unique signature in connection with determining electrical continuity of a particular TLX loop. In the illustrated embodiment, each modifying circuit 522 includes an LC circuit, with each LC circuit having different impedance and/or capacitive values. As can be appreciated, other circuit arrangements could be provided to enable a unique response for each TLX loop. With regard to its operation, the pulse generator 510 sends the small diagnostic electric current, which is particularized for each individual restraint device, in the form of one or more DC pulses or an AC signal when, for example, the vehicle ignition is first turned on. The signal from the pulse generator 510 is modified by the modifying circuits 522 which are at the attachment point between the TLX line 112 and vehicle ground. Each loop associated with the TLX line 112 makes a distinctive modification to the pulse generator signal (e.g. a characteristic ringing), which can be identified or detected by the signal monitor 514 to verify the continuity of the particular loop.

In addition, the metalized layer 412 provides moisture resistance. Protection against moisture is important for the proper functioning and ignition of the propellant 404. By providing moisture resistance in the metalized layer 412, the inner layer 408 and outer layer 416 of the explosive transfer line 112 can be constructed of an inexpensive material, such as polypropylene. In addition to being inexpensive, polypropylene is desirable because it is strong, resistant to abrasion, and an electrical insulator. However, polypropylene has heretofore been a poor choice of material for the sheath of an explosive transfer line because it has very poor moisture resistance when used without a metalized layer.

Figure 7:
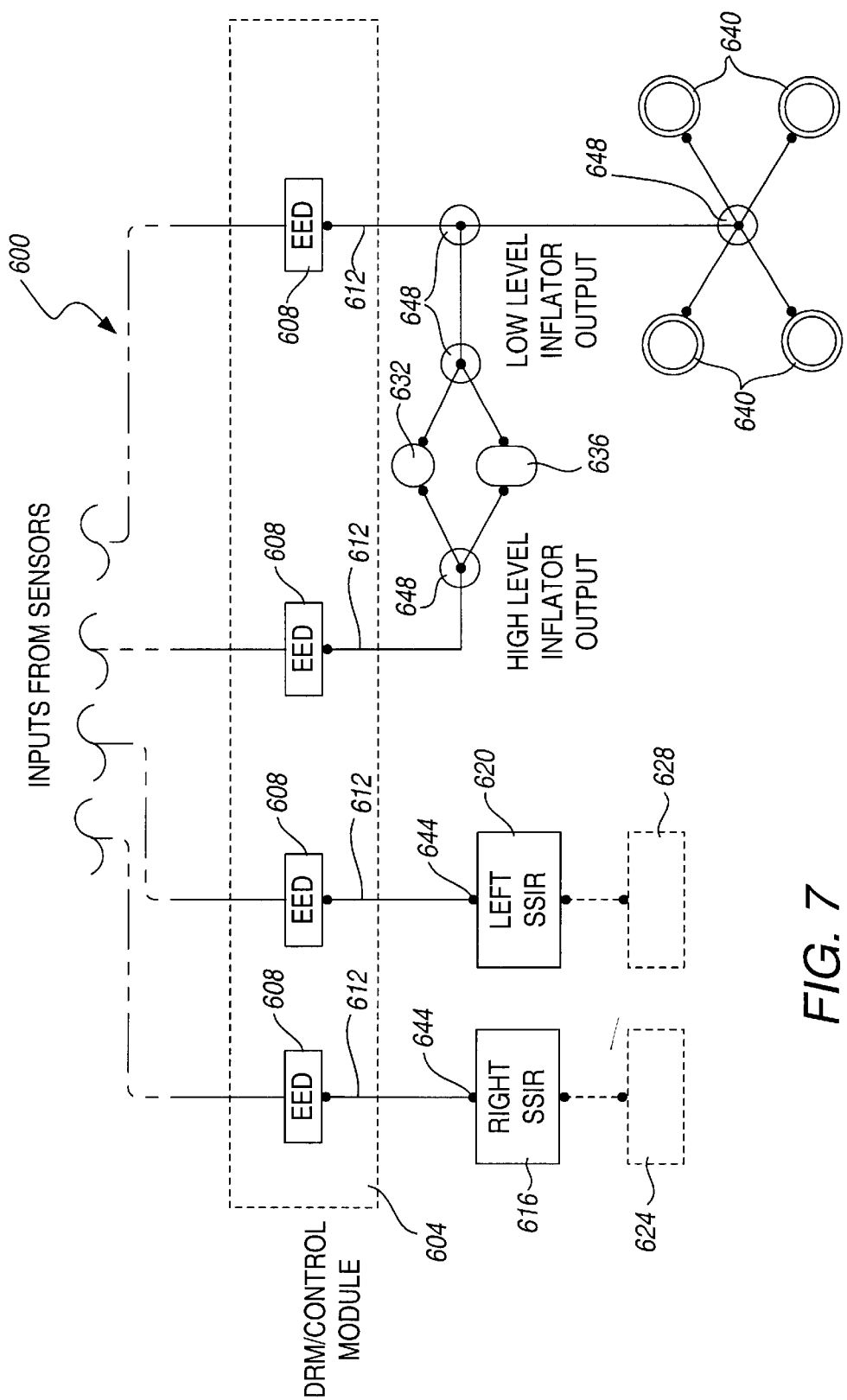
FIG. 7 is a diagram illustrating a system that can employ the central control unit and explosive transfer lines of the present invention and which system includes a number of inflatable restrains.

With reference to FIG. 7, features of the present invention can be incorporated in a control system 600. The control system 600 includes a control unit or module 604 having a number of electronic explosive devices (EEDs) 608. The devices 608 can include one or more of the initiator assemblies previously discussed. Sensor inputs are applied to the EEDs 608, which are used in activation thereof. Such sensor inputs relate to predetermined vehicle events. Outputs from the EEDs are applied to explosive transfer lines that operably connect to restraint devices located in the vehicle. In accordance with the illustrated control system 600, the restraint devices can include a number of devices including a right supplemental side inflatable restraint (SSIR) 616 and a left SSIR 620. Each of the restraint devices 616, 620, can be operably joined to one or more additional restraint devices 624, 628. Other restraint devices can include a driver side inflatable restraint (DSIR) 632 and a passenger side inflatable restraint (PSIR) 636. Other restraint devices include seatbelt pretensioners 640. Suitable connector hardware can be employed in the control system 600. Serviceable or non-serviceable end connectors 644 can join, for example, the explosive transfer lines 612 to the right and left SSIRs 616, 620. A transfer joint 648 can provide a branching from one explosive transfer line to two or more explosive transfer lines.

Figure 9:
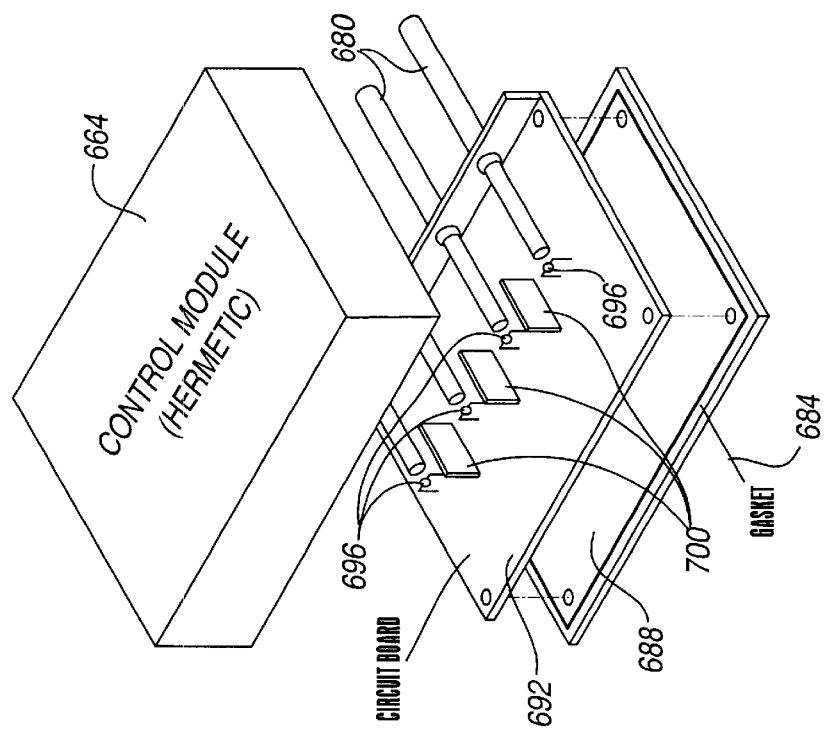
FIG. 9 is an exploded, diagrammatic illustration of the central control unit that is hermetically sealable.
Figure 8:
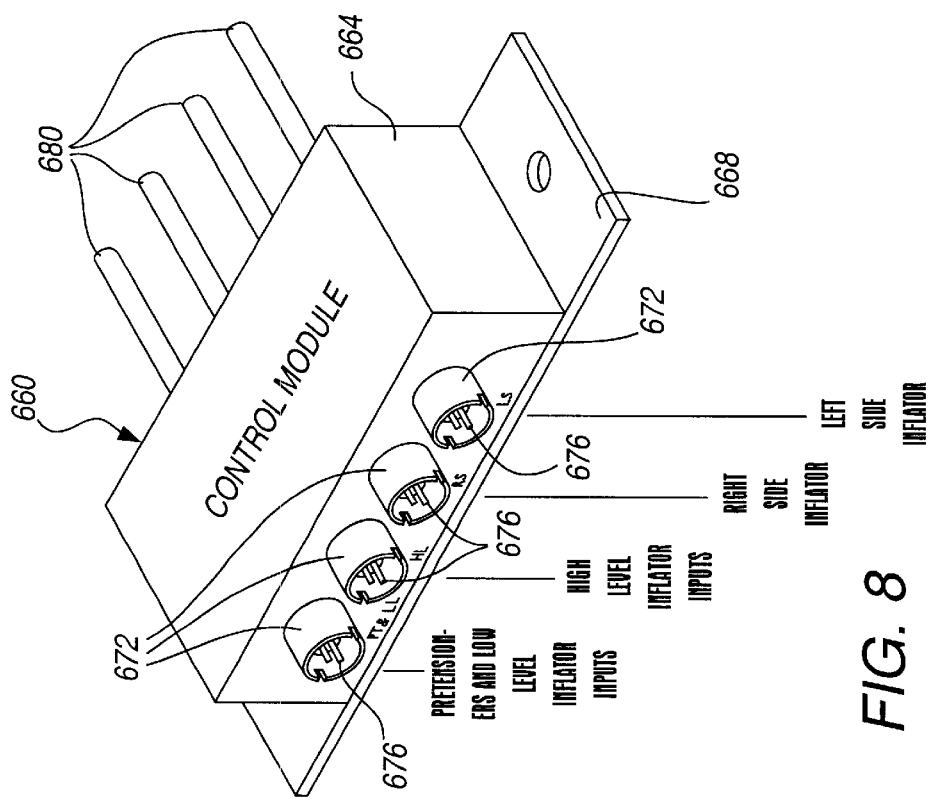
FIG. 8 diagrammatically illustrates a hermetically sealed central control unit having a number of control connectors associated with a plurality of sensor inputs for activating inflatable restraints, together with a number of explosive transfer lines that are output from the central control unit.
Figure 10:
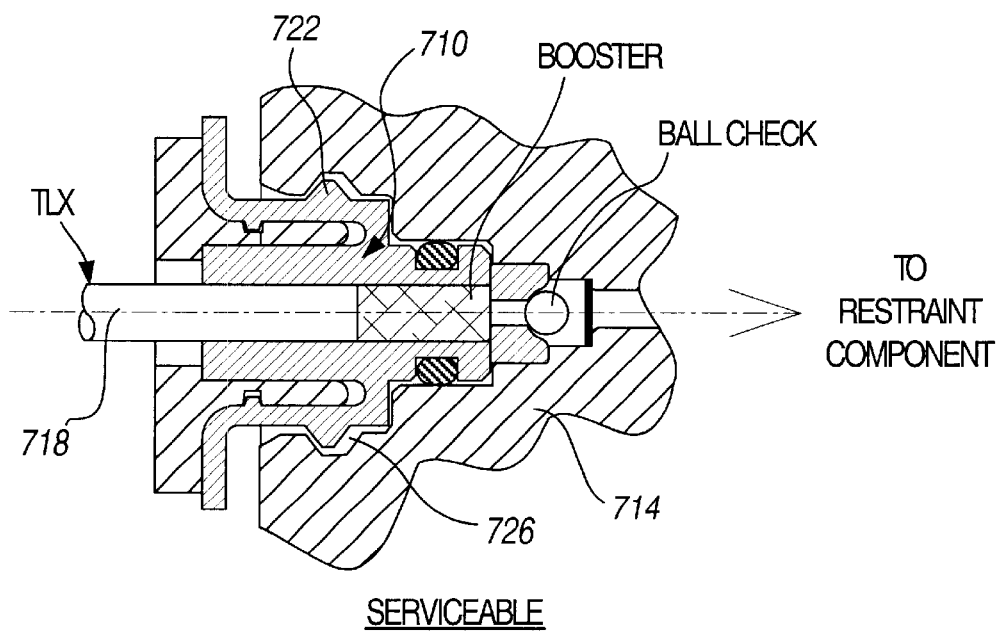
FIG. 10 illustrates a serviceable end connector joining an explosive transfer line adjacent to a restraint device.

Referring to FIGS. 8 and 9, an embodiment of a control unit or module is illustrated in which the housing or container unit provides a hermetic seal. In particular, the control module 660 includes a housing or container unit 664 supported on a base connector 668. Sensor inputs are provided to a number of control connectors 672 spaced along the length of the housing 664. A number of sensor pins 676 are located within each control connector 672. The sensor pins carry sensor inputs related to activating or triggering one or more desired restraint devices. Outputs from the control module 660 are a number of explosive transfer lines 680.

As seen in FIG. 9, in conjunction with achieving the hermetic seal, a gasket 684 is provided with an end plate 688 of the housing 664. Free ends of the explosive transfer lines 680 are spatially provided within the control module housing 664 and adjacent to a circuit board 692. The circuit board 692 has a number of electronic explosive devices 696. Each electronic explosive device 696 is operatively associated with one of the explosive transfer lines 680 at its free end. Advantageously, a number of shield numbers 700 are positioned between the electronic explosives devices 696 and separate them from each other.

Referring next to FIGS. 10–14, a number of different connectors are described that can be used in implementing a control system involving certain aspects of the present invention. FIG. 9 illustrates an embodiment of an end connector 710 that is removably connectable to a mating part or connector 714. An explosive transfer line 718 is fixedly connected to the end connector 710. The end connector 710 is removable from the mating connector 714 utilizing a snap ring 722. The snap ring 722 is removably held within a groove 726 formed in the mating connector 714. Relative pulling with suitable force can cause the end connector 722 to be released from the mating connector 714. Such a disconnection can be useful in servicing one or more components of the vehicle safety system including control system parts and/or restraint devices.

Figure 11:
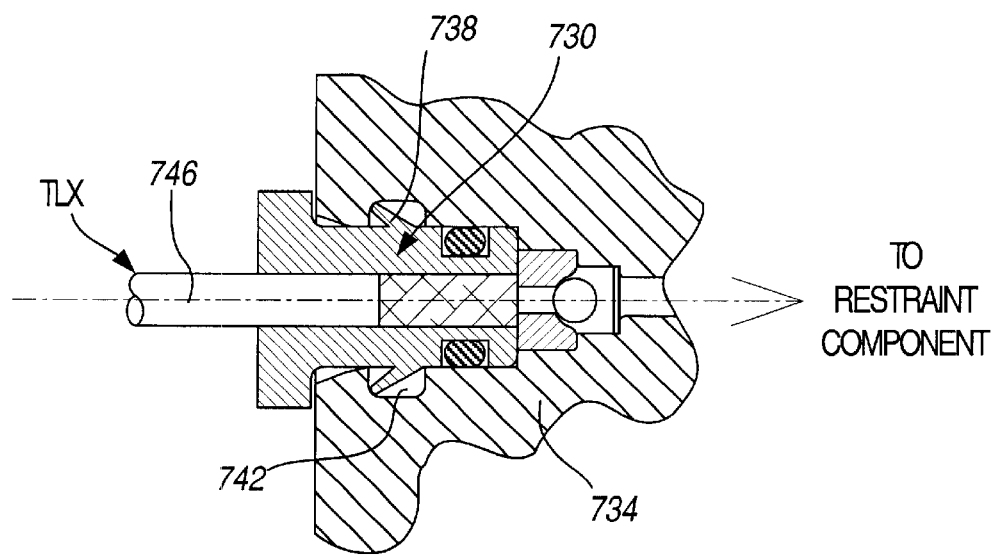
FIG. 11 illustrates a non-serviceable end connector for joining an explosive transfer line adjacent to a restraint device.

Another embodiment of an end connector is illustrated in FIG. 11. In this embodiment, the end connector 730 is designed to remain in place relative to the mating connector 734 after the interconnection is made. In this embodiment, the end connector 730 includes an annular wing member 738 that, once located within a groove 742 of the mating connector 734, prevents disconnection from the mating connector 734. That is to say, applying a predetermined force to disengage the non-serviceable end connector 730 from the mating connector 734 would not result in its disconnection, while application of this same predetermined force to the serviceable end connector 710 would result in a release or disconnection. Like the embodiment of FIG. 9, an explosive transfer line 746 is held to the end connector 730.

Figure 12:
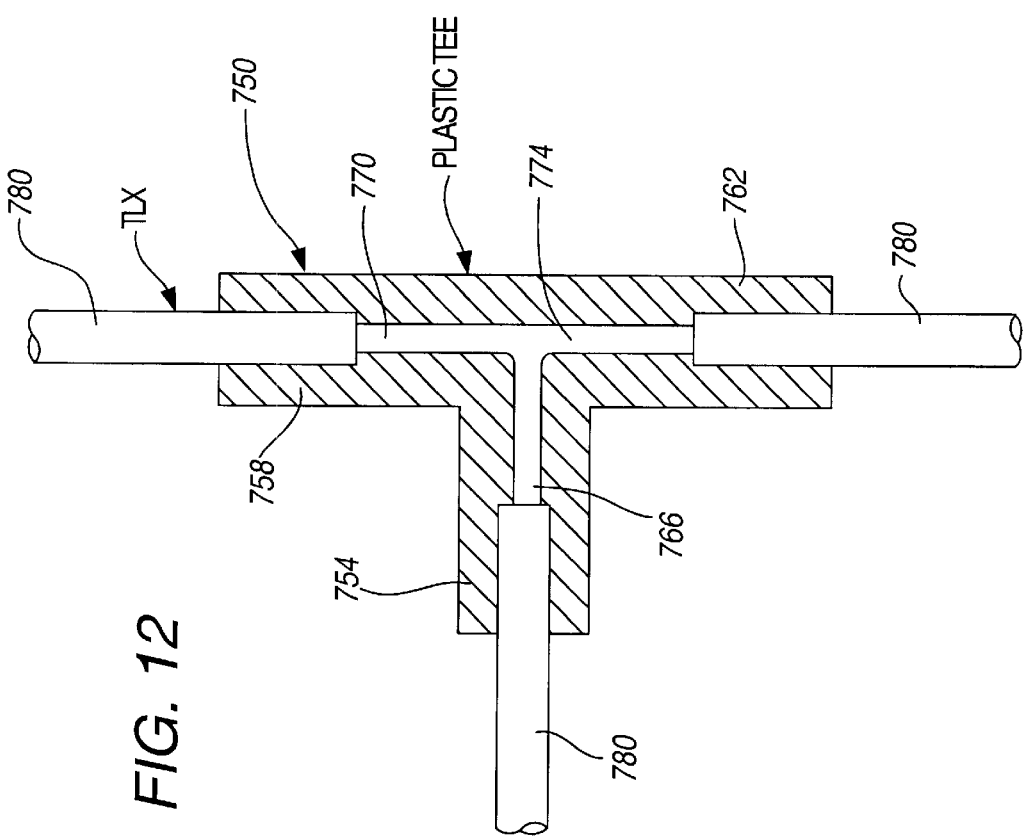
FIG. 12 illustrates a T-connector providing a dual branching of explosive transfer lines from one explosive transfer line.

Another type of connector that may be useful in a vehicle system having a number of inflatable restraints is illustrated in FIG. 12. Specifically, a T-connector or transfer joint 750 is utilized having a number of legs that may be integral with each other. The T-connector 750 enables activation of two explosive transfer lines from an activated another one explosive transfer line. The two explosive transfer lines could be directed or applied to two different restraint devices, but with each of these two restraint devices being activated under the same circumstances. In such an embodiment, a first leg member 754 branches into second and third leg members 758, 762. Each of these leg members or branches has communication bores 766, 770, 774, respectively, to permit the desired interoperability. More specifically, explosive transfer lines 780 have end portions that are held to the first, second and third leg members 754, 758, 762. The communication bores 766, 770, 762 are smaller in width or diameter than the widths or diameters of the corresponding or associated explosive transfer lines 780. When one of the explosive transfer lines 780 is activated or ignited, its activation causes the other two explosive transfer lines to also be activated due to the operable interconnection among the three explosive transfer lines. Consequently, activation of one explosive transfer line 780 can result in activation of all other explosive transfer lines associated with such a connector 750.

Figure 13:
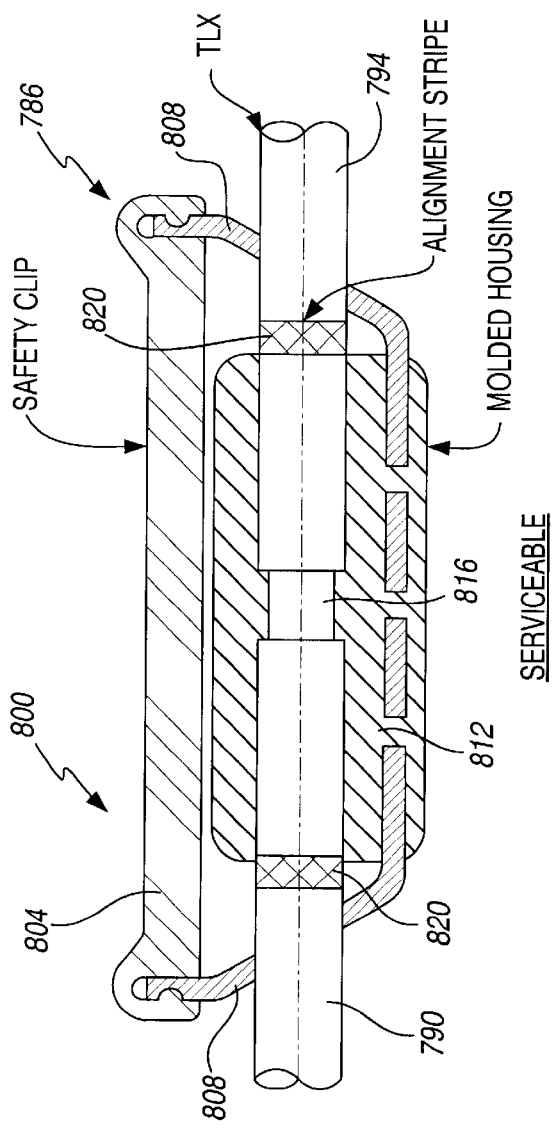
FIG. 13 illustrates a serviceable bridge connector for operatively linking two explosive transfer lines together.
Figure 14:
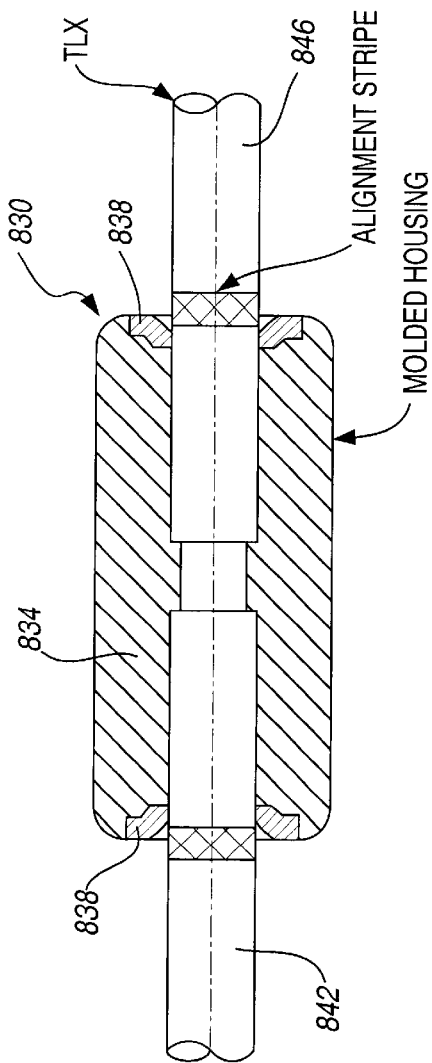
FIG. 14 illustrates a non-serviceable bridge connector for operatively linking two explosive transfer lines together.

With reference to FIGS. 13 and 14, yet another connector that may be beneficial in implementation of a vehicle safety system is illustrated. The connector of these embodiments fixedly holds together portions of explosive transfer lines. Consequently, such a connector interconnects explosive transfer lines to provide an extension of an explosive transfer in order to equal or greater distance between the control unit and a particular restraint device. In the embodiment of FIG. 13, a serviceable bridge connector is illustrated that interconnects or bridges explosive transfer lines 790, 794. The serviceable bridge connector 786 includes a clip assembly 800 having a snap plate 804 and a pair of holding members 808, 812, which are removably snap fit to the snap plate 804. The serviceable bridge connector 786 has a linking member 812 with a bore 816. End portions of each of the explosive transfer lines 790, 794 are inserted and held within the bore 816. With respect to indicating where insertion of the explosive transfer lines 790, 794 terminates relative to the bore 816, an alignment stripe 820 is provided on each of the explosive transfer lines 790, 794. The locations of the alignment stripes 820 are such that, when the explosive transfer lines 790, 794 are properly located relative to the linking member 812, such alignment stripes 820 are immediately adjacent to the ends of the linking member 812.

With regard to removably holding the explosive transfer lines 790, 794 to the linking member 812, the holding members 808 have openings that are shaped to permit insertion of the explosive transfer lines 790, 794 therethrough for subsequent insertion into the linking member 812. However, when the snap plate 804 interconnects the holding members 808, a predetermined force is insufficient to detach the explosive transfer line 790, 794 from the linking member 812 due to the operation of the holding members 808. On the other hand, upon detachment or release of the snap plate 804 from the holding members 808, such holding members 808 no longer act to prevent removal of the explosive transfer lines 790, 794 from the linking member 812. Such a serviceable bridge connector 786 can be useful in allowing trained service technicians to service, or otherwise work on, components of the vehicle safety system. Such servicing would be difficult or impractical absent detachment using the serviceable bridge connector 786.

FIG. 14 shows a non-serviceable bridge connector 830 that does not include the clip assembly 800. Instead, the linking member 834 has gripping members or teeth 838 for holding the explosive transfer lines or portions thereof 842, 846 to the linking member 834. Once the explosive transfer lines 842, 846 are inserted and held by the linking member 834, the gripping members 838 substantially prevent removal. That is to say, the explosive transfer lines 842, 846 could not be detached from the linking member 834 using the same force that can be used in detaching the explosive transfer lines 790, 794 of the embodiment of FIG. 13 when the clip assembly 800 is released or removed.

In yet another implementation or feature associated with explosive transfer lines of the present invention, it may be desirable to lay out or establish paths for explosive transfer lines before they are included in the vehicle safety system in cooperative engagement with restraint devices. In such a case, a hollow member or tube of a sufficient inner diameter may be located between connectors or system components. Such tubes, when appropriate, would be used to receive the explosive transfer lines. For each tube, an explosive transfer line would be inserted and pushed through the tube, for example, to an end of the tube adjacent to an inflatable restraint device. Once pushed through, the explosive transfer line could be fixedly held at the desired position by crimping or the like.

The invention in its broader aspects relates to an apparatus for activating a selected one or more restraint devices located in a vehicle. Hence, different designs or configurations can be provided. The plurality of initiator assemblies may include one or more initiator assemblies that are not provided together on the same circuit board. An initiator assembly, for example, could be provided with, or adjacent to, one of the restraint devices. Upon ignition of this particular initiator assembly, it may trigger, through one or more explosive transfer lines, one or more additional restraint devices. In this embodiment, the particular initiator assembly and associated restraint device act as a master, while the one or more other restraint devices that are operably connected to this particular initiator assembly act as slaves to the master. Variations thereof are also feasible related to the number, location and arrangement among the control module, the initiator assemblies, the explosive transfer lines and the restraint devices.

The foregoing description of the present invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known for practicing the invention and to enable others skilled in the art to utilize the invention in such, or in other, embodiments and with various modifications required by the particular application or use of the invention. It is intended that the appended claims be construed to include alternative embodiments to the extent permitted by the prior art.

What is claimed is:

1. An apparatus for activating a selected one or more restraint devices located in a vehicle, comprising:
   a plurality of restraint devices located in a vehicle including at least a first restraint device and a second restraint device;
   a plurality of explosive transfer lines connected to said plurality of restraint devices, said plurality of explosive transfer lines including at least a first explosive transfer line connected to said first restraint device and a second explosive transfer line connected to said second restraint device;
   a control unit for use in controlling activation of at least said first and second restraint devices, said control unit being a single control unit that controls said activation of said first and second restraint devices, said control unit having a housing and including a processor and a circuit board; and a plurality of circuit elements including at least a first circuit element and a second circuit element mounted to said circuit board, each of said plurality of explosive transfer lines being connected between said plurality of circuit elements and said plurality of restraint devices including said first explosive transfer line being connected between said first circuit element and said first restraint device and said second explosive transfer line being connected between said second circuit element and said second restraint device;

wherein said control unit receives a sensor input and said processor thereof, after said first control unit receives said sensor input, controls activation of at least said first and second circuit elements and said activation of said first circuit element ignites said first explosive transfer line and said activation of said second circuit element ignites said second explosive transfer line.

2. An apparatus, as claimed in claim 1, wherein:

said control unit has circuitry to diagnose readiness by generating a signal and monitoring said signal to check for electrical continuity of said plurality of explosive transfer lines.

3. An apparatus, as claimed in claim 1, wherein:

at least said first explosive transfer line includes a metalized layer for providing an electrical path for diagnosing electrical continuity of said first explosive transfer line.

4. An apparatus, as claimed in claim 3, wherein:

said first explosive transfer line includes an outer layer for providing abrasion protection that is disposed outwardly of said metalized layer.

5. An apparatus, as claimed in claim 1, wherein:

at least said first circuit element includes one of the following: a laser diode, a bridge element and a semiconductor bridge device.

6. An apparatus, as claimed in claim 1, wherein:

said control unit is hermetically sealed.

7. An apparatus, as claimed in claim 1, wherein:

said first explosive transfer line has pyrotechnic material deposited thereon in liquid slurry form.

8. An apparatus, as claimed in claim 1, wherein:

said circuit board is contained in said housing and portions of at least said first explosive transfer line extend into said housing and remaining portions of said first explosive transfer line extend away from said housing toward said first restraint device.

9. An apparatus, as claimed in claim 1, wherein:

said first circuit element is located adjacent to said first restraint device.

10. An apparatus for activating a restraint device in a vehicle, comprising:

a first explosive transfer line having a metalized layer that provides an electrical path for diagnosing electrical continuity;

a second explosive transfer line having a metalized layer that provides an electrical path for diagnosing electrical continuity;

a first circuit element operatively connected to said first explosive transfer line;

a second circuit element operatively connected to said second explosive transfer line;

a control unit operatively associated with each of said first and second circuit elements for controlling activation thereof;

circuitry in communication with said control unit that provides a first return signal associated with said first explosive transfer line and a second return signal associated with said second explosive transfer line and in which said first and second return signals are different from each other such that a separate determination can be made related to continuity for each of said first and second explosive transfer lines;

a first restraint device operatively associated with said first explosive transfer line; and a second restraint device operatively associated with said second explosive transfer line.

11. An apparatus, as claimed in claim 10, wherein:

said metalized layer has a moisture resistance property.

12. An apparatus, as claimed in claim 10, wherein:

said first circuit element communicates with pyrotechnic material and said pyrotechnic material is coupled to said first explosive transfer line and in which said pyrotechnic material is activated by said first circuit element under control of said control unit.

13. An apparatus, as claimed in claim 10, wherein:

said circuitry includes at least a first modifying circuit having a first impedance associated therewith.

14. An apparatus, as claimed in claim 13, wherein:

said first modifying circuit includes a LC circuit.

15. An apparatus, as claimed in claim 10, wherein:

said control unit includes a pulse generator that produces pulses that are transmitted along each of said metalized layers of said first and second explosive transfer lines and a signal monitor that monitors said pulses.

* * * * *